United States Patent [19]

Freimark et al.

[11] 3,747,005

[45] July 17, 1973

[54] AUTOMATIC BIASED CONTROLLED AMPLIFIER

[75] Inventors: Ronald J. Freimark, Addison; Ole K. Nilssen, Barrington Hills, both of Ill.

[73] Assignee: Motorola, Inc., Franklin, Ill.

[22] Filed: Feb. 1, 1971

[21] Appl. No.: 111,455

[52] U.S. Cl. .......................... 330/22, 330/24, 330/26, 330/29, 330/32, 330/40

[51] Int. Cl. .......................... H03f 3/04

[58] Field of Search .......................... 330/22, 32, 40, 24

[56] References Cited

UNITED STATES PATENTS

| | | | |
|---|---|---|---|
| 2,847,519 | 8/1958 | Aronson | 330/24 X |
| 3,496,383 | 2/1970 | Tomsa | 330/32 X |
| 3,215,851 | 11/1955 | Warnock | 330/32 X |

*Primary Examiner*—Roy Lake
*Assistant Examiner*—Lawrence J. Dahl
*Attorney*—Mueller & Aichele

[57] ABSTRACT

An audio power amplifier comprising a transistor operated as an emitter follower which is quiescently biased so that the DC current through the output speaker is small. A feedback circuit connected between the output and the control electrode of the transistor compares the magnitude of the output peak voltage with the magnitude of the bias potential on the control electrode. When the peak output voltage exceeds the magnitude of the bias potential the feedback circuit increases the control bias potential to raise the operating point of the transistor. Where the magnitude of the peak voltage of the output does not exceed the magnitude of the bias potential, there is no feedback and the bias potential is maintained to keep the transistor at its quiescent operating point.

5 Claims, 1 Drawing Figure

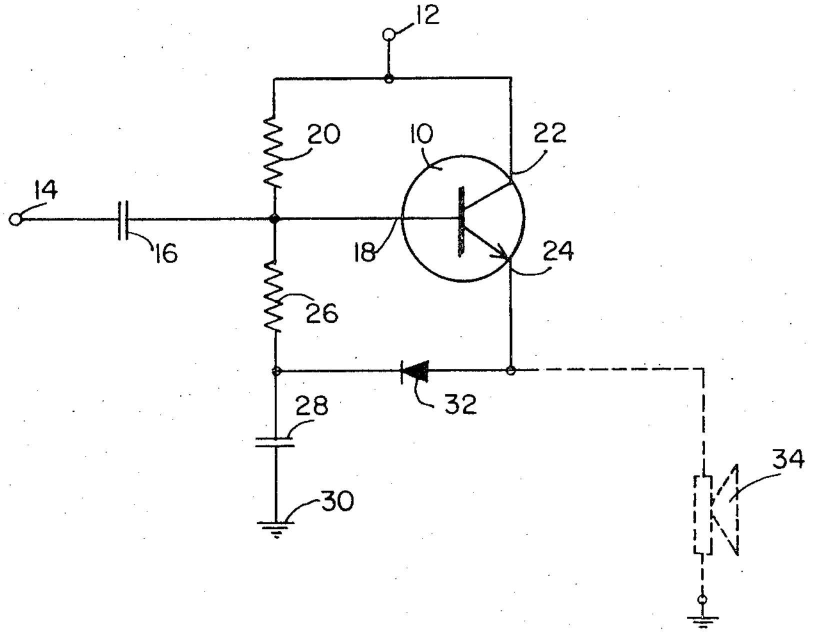
Inventor
RONALD J. FREIMARK
OLE K. NILSSEN
BY Mueller & Aichele
ATTYS.

AUTOMATIC BIASED CONTROLLED AMPLIFIER

BACKGROUND OF THE INVENTION

In the past radios have utilized autotransformer-type class "A" audio amplifiers. However, in these amplifiers an output transformer was required. It was necessary for providing impedance matching between the output impedance of the circuit and input impedance of the speaker. In such amplifiers the average DC dissipation on both the transistor and the load was fairly high, and was present even with no driving signal applied to the amplifier. As a consequence, radio design required taking into account the heat generated. This naturally led to greater radio dimensions and specialized heat dissipation equipment within the radio.

A control arrangement has been suggested for controling the operating condition of an amplifier by means of a separate control source, which controls the bias in a transistor amplifier. However, this arrangement provides no means whereby the separate control device can be made to depend upon the output of the amplifier. Further, it in no way eliminates the aforementioned drawbacks of the autotransformer-type class "A" audio amplifiers.

SUMMARY OF THE INVENTION

It is an object of this invention to decrease the DC power dissipation in the transistor and load of a power amplifier.

It is a further object of this invention to eliminate the necessity of an output transformer in a power amplifier.

In a preferred embodiment of this invention the base electrode of an NPN transistor is coupled to an audio driving signal through a capacitor. A positive power supply is connected by first resistance means to the base electrode for biasing the same and to the collector. A second resistance means is connected between the base of the transistor and the cathode of a diode, the anode of which is connected to the emitter of the transistor. This second resistance means and diode operate in conjunction with a capacitor, connected between the cathode of the diode and a reference potential, to automatically change the bias on the base electrode of the transistor in accordance with changes in the peak output of the transistor amplifier. The diode becomes energized when the signal peaks at the emitter electrode exceed the potential across the capacitor. The current flow in turn causes the potential across the capacitor to increase to drive the transistor toward saturation. The diode is de-energized, for instance, during negative swings of the signal when the magnitude of the signal peak at the emitter electrode approaches the potential across the capacitor. While the diode is deenergized, the capacitor is permitted to discharge to maintain the operating point of the transistor at the desired level to insure that there is no clipping of the negative half waves. When no signal is present the capacitor discharges and the bias on the base of the transistor maintains the same at its quiescent operating point.

BRIEF DESCRIPTION OF THE DRAWING

The figure is a schematic circuit diagram in accordance with the present invention.

DETAILED DESCRIPTION

Referring now to the drawing, an NPN transistor 10 is utilized as the amplifying means of the present invention. However, either NPN or PNP transistors may be used for the emitter follower circiit shown in the drawing. In the following description which is for NPN operation, the power supply potential 12 is positive with respect to the reference potential 30, and conversely for PNP operation it would be negative with respect to the reference potential. The input signal 14, or audio driving signal, is coupled to the base 18 of transistor 10 through capacitor 16 to isolate the input from DC components.

Forward biasing of the transistor 10 is accomplished with power supply 12 being coupled through resistor 20 to the base electrode 18. The collector electrode 22 of the transistor is connected directly to the bias potential 12. With the transistor biased for operation, a signal is introduced at input 14 for amplification at the output, the emitter electrode 24. Biasing of the circuit and in particular of the base electrode 18 of the transistor is controlled not only by the resistor 20 but also by resistor 26 and capacitor 28 coupled between the base electrode 18 and the reference potential 30. With no signal at the input, the bias potential at the base 18 is dependent upon the bias potential 12 and resistance 20, and approximately equals the voltage across capacitor 28. A predetermined bias value is selected to maintain the transistor at its quiescent operating point with no signal present.

A feedback circuit which includes the diode 32, capacitor 28 and resistor 26 is connected between the emitter 24 and control electrode 18 of transistor 10. With an AC driving signal introduced at the input 14 a positive peak output greater than the bias potential 12 causes the diode 32 to conduct, since the potential at the output exceeds the potential across the capacitor 28, i.e., the bias control potential. The conduction of diode 32 causes an instantaneous current to flow through capacitor 28 to the ground reference potential 30 to increase the charge on the capacitor which in turn drives the transistor toward saturation. Subsequently, during the negative half cycle of the signal the charge on the capacitor maintains the operating point of the transistor 10 at a level to insure that the negative portion of the wave is not clipped. When the signal level drops below the charge on capacitor 28, the diode 32 ceases conducting so the capacitor 28 discharges reducing the bias on the base 18 of the transistor thereby moving the operating point of the transistor toward its quiescent level. The base bias potential is thus permitted to readjust and approach its steady state value.

The response of the circuit is extremely rapid to avoid clipping the signal and causing undesirable distortion. If a negative peak occurs first it will be clipped by the transistor 10; however, this is not noticeable at the speaker 34 output. Subsequently, the capacitor 28 is quickly charged on the following positive peak raising the operating point of the transistor such that the following negative peaks will be passed without being clipped thereby insuring amplification of the signal substantially without distortion.

The present invention provides for lower DC dissipation in the transistor and load in comparison to prior audio power amplifiers by permitting the bias potential of the transistor to be maintained at a low level with no signal present. This is accomplished by the feedback effect of the amplifier circuitry which automatically maintains the bias potential at the lowest possible level for Class "A" operation. In a sense the amplifier effectively goes to sleep during periods where no signal burst is present. As a consequence, the DC dissipation in the transistor and also in the load is reduced.

What has been described, therefore, is a unique audio power amplifier circuit which decreases the DC power dissipation in the transistor amplifier and load, and which eliminates the need for a transformer for coupling the signal to the output speaker.

We claim:

1. An automatic biased controlled amplifier circuit producing AC output signals in response to AC input signals, said amplifier comprising amplifying means including an electron control device having control and output electrodes, first circuit means coupling the AC input signal to said electron control device, bias circuit means connecting a predetermined bias voltage to the control electrode of said electron control device for biasing the same substantially to its quiescent operating point, feedback circuit means including a diode and a capacitor connected between the output and control electrodes of said electron control device, said diode connected between the output electrode of said electron control device and said capacitor to charge said capacitor by an output signal of one polarity from said electron control device exceeding said predetermined bias voltage to raise the operating point of said electron control device from said substantially quiescent condition to permit the passing of the AC input signal of a polarity opposite said one polarity substantially free of distortion.

2. The automatic bias controlled amplifier circuit of claim 1 wherein said capacitor is connected between a reference potential and said feedback circuit means.

3. The automatic bias controlled amplifier circuit of claim 6 wherein said electron control device is a transistor and said diode acts to charge said capacitor on one of said positive and negative swings of said AC signal to raise the operating point of said transistor from said quiescent point, said capacitor acting to maintain said transistor substantially at said raised operating point during the other one of said positive and negative swings of said AC signal.

4. The automatic bias controlled amplifier circuit of claim 3 wherein said transistor is of the NPN type.

5. The automatic bias controlled amplifier circuit of claim 3 wherein said transistor is of the PNP type.

* * * * *